(12) United States Patent
Schiel

(10) Patent No.: US 8,167,544 B2
(45) Date of Patent: May 1, 2012

(54) ROTATING DEVICE TO BE USED IN A FLUID

(75) Inventor: Hans-Josef Schiel, Lindenschied (DE)

(73) Assignee: Aquapower GmbH, Mainz (DE)

( * ) Notice: Subject to any disclaimer, the term of this patent is extended or adjusted under 35 U.S.C. 154(b) by 922 days.

(21) Appl. No.: 12/161,091

(22) PCT Filed: Jan. 17, 2007

(86) PCT No.: PCT/DE2007/000063
§ 371 (c)(1),
(2), (4) Date: Aug. 12, 2008

(87) PCT Pub. No.: WO2007/082506
PCT Pub. Date: Jul. 26, 2007

(65) Prior Publication Data
US 2009/0010761 A1     Jan. 8, 2009

(30) Foreign Application Priority Data

Jan. 17, 2006 (DE) .......................... 10 2006 002 137

(51) Int. Cl.
*F01D 17/12* (2006.01)
(52) U.S. Cl. ........ 415/148; 415/150; 415/163; 416/111; 416/156; 416/160
(58) Field of Classification Search ................... 415/4.2, 415/4.4, 148, 150, 163; 416/111, 156, 160
See application file for complete search history.

(56) References Cited

U.S. PATENT DOCUMENTS

| 1,408,988 | A | 3/1922 | Chenoweth |
| 4,260,328 | A | 4/1981 | Hamel |
| 4,507,049 | A | 3/1985 | Strandgren |
| 5,324,164 | A | 6/1994 | Doering et al. |
| 2010/0303613 | A1* | 12/2010 | Schiel .......................... 415/148 |

FOREIGN PATENT DOCUMENTS
DE     3606549 A1     9/1987
(Continued)

OTHER PUBLICATIONS

Search Report of International Patent Application No. PCT/DE2007/000063 mailed Jun. 25, 2007.

*Primary Examiner* — Jack Chen
(74) *Attorney, Agent, or Firm* — Lowe Hauptman Ham & Berner LLP

(57) ABSTRACT

The invention relates to a rotational device that is to be used in a fluid in order to generate power from the moving stream of a fluid or to convert energy into a motion of a fluid. Said rotational device comprises main rotating means which is fixedly connected to a central rotary shaft of the rotational device, one or several rotational surfaces which are mounted on the main rotating means so as to be rotatable about rotational surface rotary shafts spaced away from the rotary shaft such that the main rotating means are able to perform a rotational motion about the central rotary shaft by means of at least one rotational surface, the rotational surface rotary shafts extending parallel to the rotary shaft of the main body. A device is provided which adjusts an angle of the rotational surface relative to the direction of flow of the fluid in such way that the buoyancy principle is maintained on the rotational surface.

15 Claims, 11 Drawing Sheets

FOREIGN PATENT DOCUMENTS

| | | | |
|---|---|---|---|
| DE | 19603982 | A1 | 8/1997 |
| DE | 19715373 | A1 | 10/1998 |
| DE | 10258358 | A1 | 6/2004 |
| DE | 10324455 | A1 | 12/2004 |
| DE | 102004012703 | A1 | 10/2005 |
| EP | 0008590 | A1 | 3/1980 |
| GB | 2263735 | A | 8/1993 |
| GB | 2356431 | A | 5/2001 |
| WO | 2004061299 | A1 | 7/2004 |

* cited by examiner

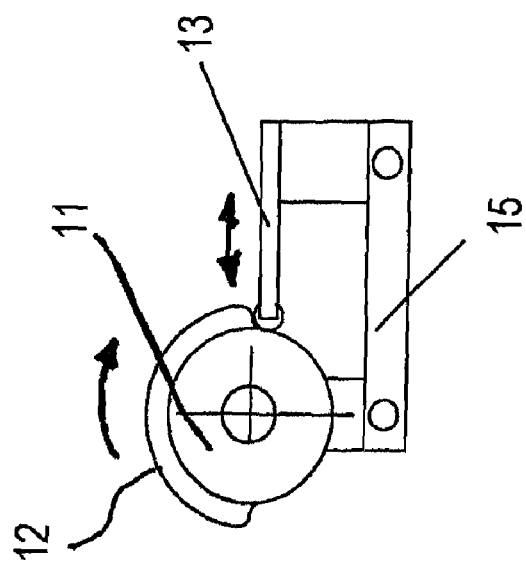
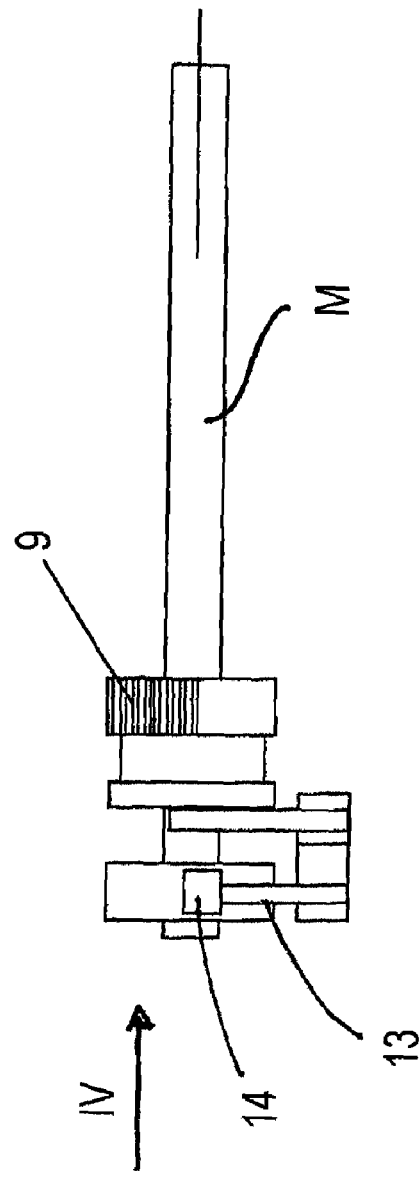
Fig.5
Fig.4

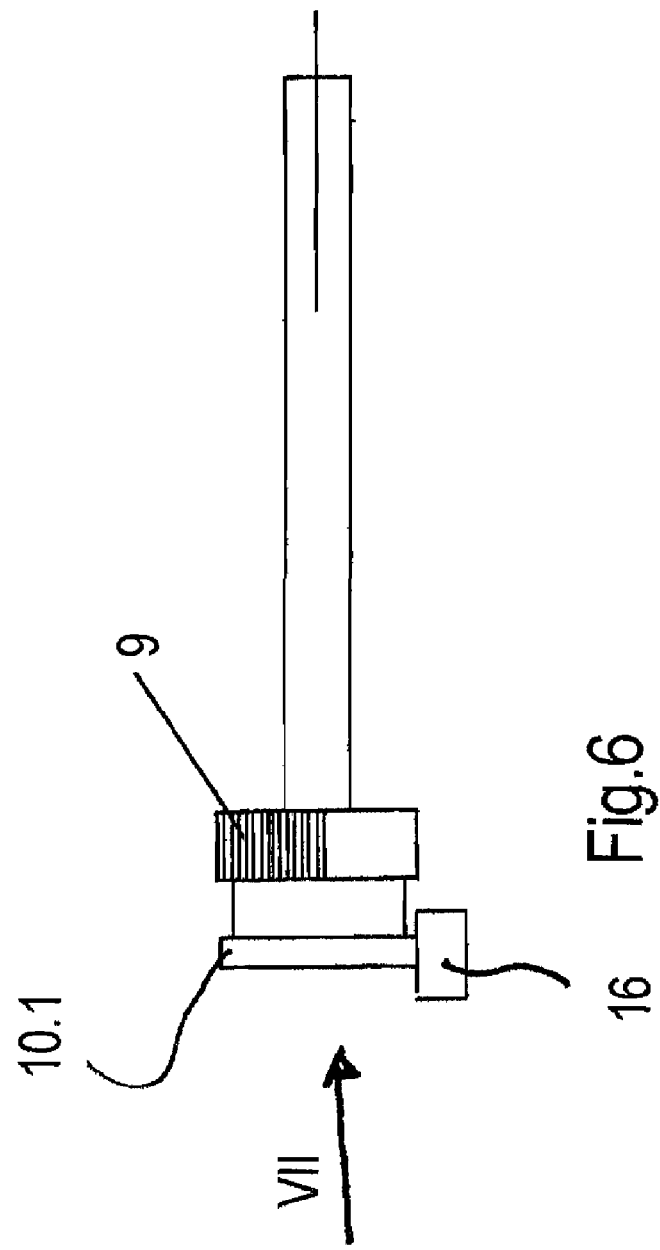

ROTATING DEVICE TO BE USED IN A FLUID

RELATED APPLICATIONS

The present application is based on International Application No. PCT/DE2007/000063 filed Jan. 17, 2007, and claims priority from German Application Number 10 2006 002 137.1, filed Jan. 17, 2006.

DESCRIPTION

The invention relates to a rotational device for use in a fluid for the purpose of extracting energy from the moving fluid stream or for the purpose of converting energy into motion of a fluid.

By means the rotational device in accordance with the invention or similar devices energy can be extracted from a moving fluid stream which may be a gas or a liquid, e.g. wind or water, by arranging the rotational device in the fluid as is the case e.g. also with a turbine. Conversely, by setting the rotational device in motion by a separate drive, a moving fluid stream can be generated.

Known in practice and in use are wind wheels, turbines, propellers or ship's screws. All of these systems feature too small a differential velocity between the mass inflow and the rotating active surface of the rotational systems as powered systems or between the active surface and the fluid to be driven and thus a relatively low efficiency.

Described in DE 103 24 455 A1 is a rotational sail as a known rotational device in which in addition to rotation of the active surfaces or blades about a fulcrum, a surface is caused to rotate about its own axis and in which one or more surfaces or blades make half a rotation in a main rotational body of the rotational device in thereby rotating in a ratio of 1:2 against the direction of rotation of the main rotational body. But since the incident flow of the active surfaces can result in a disruption in the flow at the active surface the efficiency of this known rotational device is low.

It is thus the object of the invention to define a rotational device featuring an improved efficiency.

This object is achieved by the rotational device in accordance with the invention as set forth in claim 1. Accordingly, the rotational device as used in a fluid to extract energy from a moving fluid stream or to convert energy into a motion of a fluid features a main rotating means or main body which is fixedly connected to a central rotary shaft of the rotational device, one or more rotational surfaces or rotor blades coupled rotatable about their rotational surface shafts or rotor blade shafts spaced away from the central rotary shaft to the main rotating means such that the main rotating means can execute by at least one rotational surface or by a plurality of rotational surfaces a rotational motion about the central rotary shaft, the shafts of the rotational surfaces extending parallel to the central rotary shaft of the main rotating means and an adjusting means or controlling means being provided to adjust the rotational surface(s) relative to the direction of the moving fluid stream such that the principle of buoyancy is maintained at the rotational surface or at each of the rotational surfaces.

Principle of buoyancy in this context is understood to be a condition in the moving fluid stream at the rotational surface, also termed a rotor blade or vane, in which the moving fluid stream at the rotational surface is continuous. The principle of buoyancy is not provided when the moving fluid stream at the rotational surface is disrupted or discontinued or swirling of the moving fluid stream occurs at the rotational surface. The decisive advantage afforded by the rotational device in accordance with the invention, however, is that the position of the rotational surfaces to the direction of the moving fluid stream is now maintained by the adjusting or positioning means always within the principle of buoyancy to attain maximum efficiency of the rotational device.

Preferably, the rotational surface(s) is/are adjusted or pitched in the range −25° to 25° (angular degrees) relative to the direction of the moving fluid stream.

In one preferred embodiment of the rotational device in accordance with the invention, the angles of the rotational surfaces are segmentally constant relative to the direction of moving fluid stream by a full rotation of the main rotating means about its central rotary shaft. The adjusting means can pitch the rotational surface(s) through 0°-180° (first and second quadrant) of the rotational motion of the main rotating means to a first, constant positive angle and through 180° to 360° (third and fourth quadrant) of the rotational motion of the main rotating means to a second, constant negative angle relative to the direction of moving fluid stream, the angle of the one angular domain having the same value or quantity as the angle of the other angular domain but with a reversed polarity relative to the direction of the moving fluid stream. This has the advantage that except for the neutral positions of the rotational surface(s) at 0° and 180° respectively the active torque is substantially constant and positive, resulting in a uniform, effective rotational motion of the rotor or rotational device. This is evident diagrammatically in FIG. 2 illustrating how the rotational torque acts on the rotational means.

Preferably, the adjusting means or controller adjusts the rotational surface(s) relative to the direction of the moving fluid stream to an optimum value of the angle which, as has been discovered, is near to discontinuation of the buoyancy action of the rotational surface(s).

The adjusting means may comprise a controlling cam or a controlling curve fixedly coupled to the central rotary shaft of the main rotating means, a drive coupled to the controlling cam and rotational surface(s) and converting the motion of the controlling cam or of the controlling curve into a rotational motion of the rotational surface(s) for adjusting the angle or pitch of the rotational surfaces relative to the direction of the moving fluid stream. This arrangement reliably achieves precise adjusting of position of the rotational surfaces.

As an alternative, the adjusting means may have an electric or electric motor drive coupled to the rotational surface(s) for pitching the rotational surface(s) as a function of the rotational position of the main rotating means.

The adjusting means can also set a neutral position or neutral angle of the rotational device(s) relative to the direction of the moving fluid stream in which the rotational surface concerned exerts no torque on the main rotating means of the rotational device in accordance with the invention. This prevents the rotational device from being damaged by an excessively strong or surge flow. Preferably the adjusted angle of the rotational surface in the neutral position is 0°.

The rotational device in accordance with the invention may preferably featuring a pivoting control wheel loosely mounted on the central rotary shaft of the rotational device, i.e. not rigidly or positively connected radially to the central rotary shaft, the pivoting control wheel being coupled to the rotational surface(s) for transferring its pivoting motion or its reciprocating rotational action to the rotational surfaces.

In a preferred embodiment of the invention, the rotational surface or surfaces of the rotational device are configured to be changeable in shape to adjust the angle of the corresponding rotational surface relative to the direction of the moving fluid stream by the adjusting means. Being able to alter the shape of the rotational surface, particularly in changing the cross-section of the rotational surface or the rotor vane, a high efficiency of the rotational device in accordance with the invention can be achieved.

In general, the rotational surfaces in accordance with the invention rotate in a rotational body about a fulcrum M and are thereby controlled by an electrical or mechanical gear transmission ratio or gear reduction, a drive, or gearing such that the rotational surfaces rotate relative to the rotational body by the ratio of 1:1 contrary to the direction of rotation of the rotational body about M1 (see FIG. 1) although an external observer has the impression of an unchanged positioning.

A non-uniform reduction in transmission operated mechanically or electrically can adjust or pitch the rotational surfaces over the first 180° deg. of the rotational motion about a fulcrum M to an angle of e.g. 10-12 deg. being advantageous in flow and advancing the actual reduction in transmission, and over the second 180° deg. to an angle of e.g. 10-20 deg. being advantageous in flow and lagging the actual reduction in transmission. This asymmetrical reduction in transmission in the quadrants, e.g. three and four, provides advancing of the rotational surface by an angle of e.g. 10 deg. relative to the direction of the flow of the medium, and lagging in the quadrants one and two by an angle of e.g. 10 deg. This makes it possible that each respective rotational surface is positioned for a large segment of the angle of rotation in rotational motion on a circular path about a central axis M at an angle favorably effective relative to both the inflowing fluid mass and outflowing fluid mass.

The main 1:1 reduction in transmission in accordance with the invention ensures positioning of the rotational surfaces relative to the direction of the moving fluid stream which in rotation of main rotating means are always parallel to the direction of the moving fluid stream, and which are moved into a position to provide buoyancy only by a pivoting control wheel or some similar or direct driving means.

As a result of the favorable efficiency angle relative to both the mass inflow and outflow there is no mixtures of the drag principle and the principle of buoyancy. Thus a feature essential to the rotational device in accordance with the invention is a pure buoyancy principle which is discontinued only at the turning points of angle adjustment.

A further feature of the invention is the pivoting motion which brings the rotational surfaces in one half of their circular motion into a positive angle or pitch and in the other half of the circular motion into a negative angle of the respective rotational surface relative to the flowing direction of the fluid.

Due to the 1:1 reduction in transmission, a position being neutral in torque of the rotational surfaces can be obtained when the pivoting control wheel of the adjusting means of the rotational device is in a neutral position.

The invention also relates to a rotational device for use in a fluid to extract energy from the flowing motion of a fluid or to convert energy into a motion of a fluid, comprising main rotating means fixedly connected to a central rotary shaft of the rotational device, one or more rotational surfaces mounted rotatable about their rotational surface rotary shafts spaced away from the rotary shaft such that the main rotating means is able to execute a rotational motion about the central rotary shaft by at least one rotational surface, the rotary shafts of the rotational surfaces extending parallel to the axis of the main body, means being provided for adjusting the angle of the rotational surface relative to a direction of the flowing direction of the fluid, the means adjusting the angle or pitch of the rotational surface in 0°-180° of the rotational motion of the main rotational body to a first constant positive angle and the means adjusting the rotational surface in 180° to 360° of the rotational motion of the main rotational body to a second constant negative angle relative to the direction of the flowing direction of the fluid, these angles having the same value but with reverse polarity or sign relative to the direction of the flowing direction of the fluid.

The invention relates furthermore to a fluid to extract energy from the moving fluid stream or to convert energy into a motion of a fluid, comprising main rotating means fixedly connected to a central rotary shaft of the rotational device, one or more rotational surfaces coupled rotatable about their rotational surface rotary shafts spaced away from the central rotary shaft to the main rotating means such that the main rotating means can execute driven by at least one rotational surface a rotational motion about the central rotary shaft, the rotary shafts of the rotational surfaces extending parallel to the axis of the main rotating means, the rotational surface being alterable in shape to adjust the angle of rotational surface relative to the flowing direction of the fluid or to set the buoyancy of the rotational surface in the stream of the fluid by adjusting means, particularly in certain portions of the circular motion each to be constant.

The rotational device of the present invention can be used e.g. as a wind wheel, turbine, propeller or ship's screw.

Other advantageous embodiments of the invention are mentioned in the sub-claims.

Further advantages, advantageous embodiments and applications of the present invention are provided by the following detailed description of preferred exemplary embodiments in connection with the drawings in which:

FIG. 4 is a detail view showing adjustment means for the rotational surfaces of the first embodiment as shown in FIG. 1 to FIG. 3;

FIG. 5 is a view of the adjusting means as shown in FIG. 4 but as viewed in the direction of the arrow V in FIG. 4;

FIG. 6 is a further detail view showing adjusting means as an alternative to the embodiment as shown in FIG. 4;

FIG. 7 is a view of the adjusting means in FIG. 6 but in the direction of the arrow VII as shown in FIG. 7;

Figure 1:
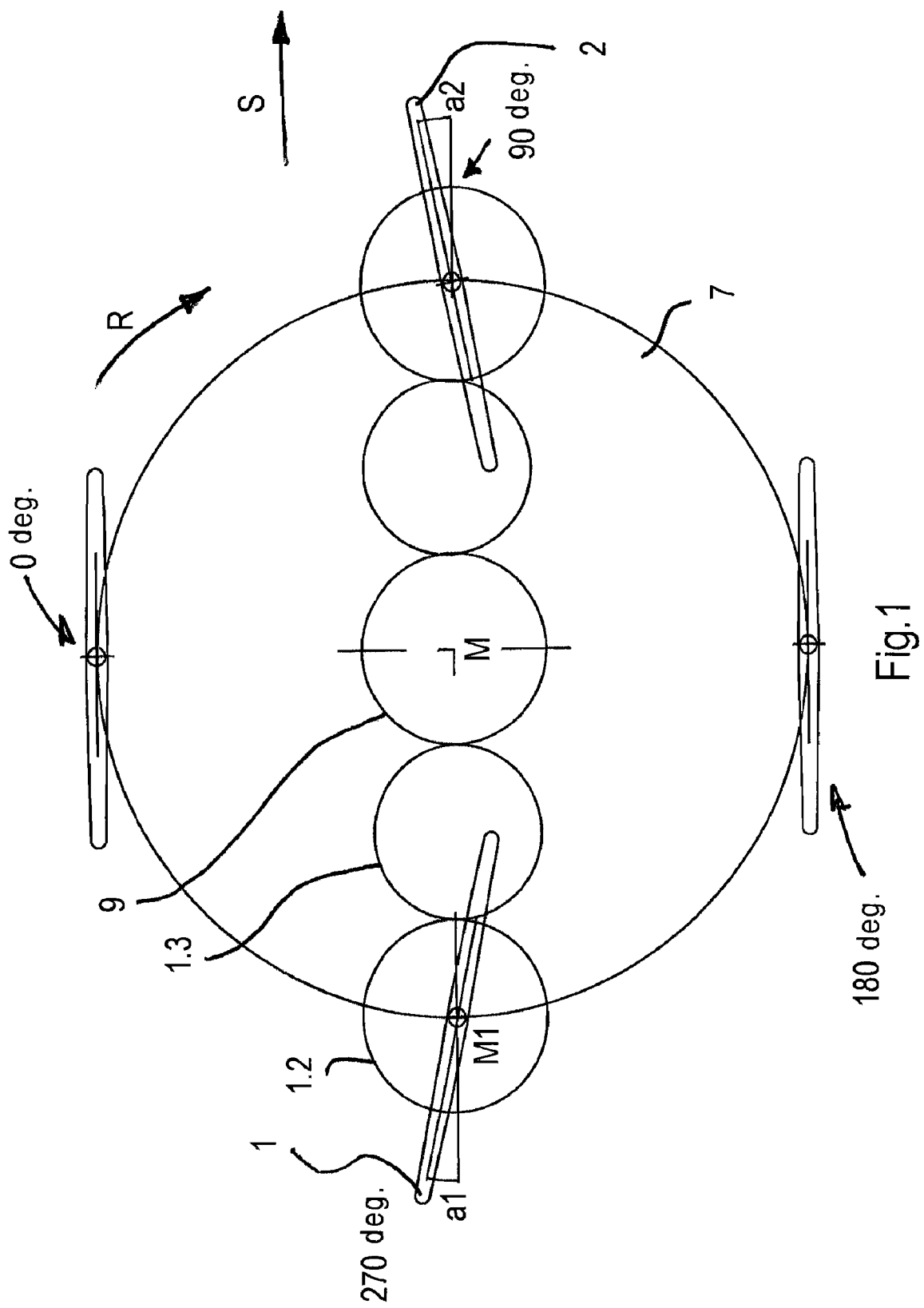
FIG. 1 is a schematical top-down view of a first example embodiment of the rotational device in accordance with the invention comprising two rotational surfaces, neutral positions of the rotational surfaces are shown.

Referring now to FIG. 1 there is illustrated schematically a top-down view of a first example embodiment of the rotational device in accordance with the invention comprising two identically structured rotational surfaces 1, 2 facing each other and being impinged by the moving stream of a fluid in a torque-active position of 270° deg. and 90° respectively, as an example, shown relative to the circular motion of a rotational surface 1, 2 in the rotational device about a central axis M of the rotational device in a total range of 360°. The direction of the circular motion as shown in FIG. 1 is identified by an arrow R. Furthermore, in FIG. 1, neutral positions of the rotational surfaces are indicated which are at 0° and 180° and in which the rotational surfaces are oriented in the direction of the flowing direction of the fluid, e.g. of water or wind. The direction of the flowing direction of the fluid is designated in FIG. 1 by an arrow S. No torque is generated by the rotational surfaces 1, 2 in the neutral position.

Figure 2:
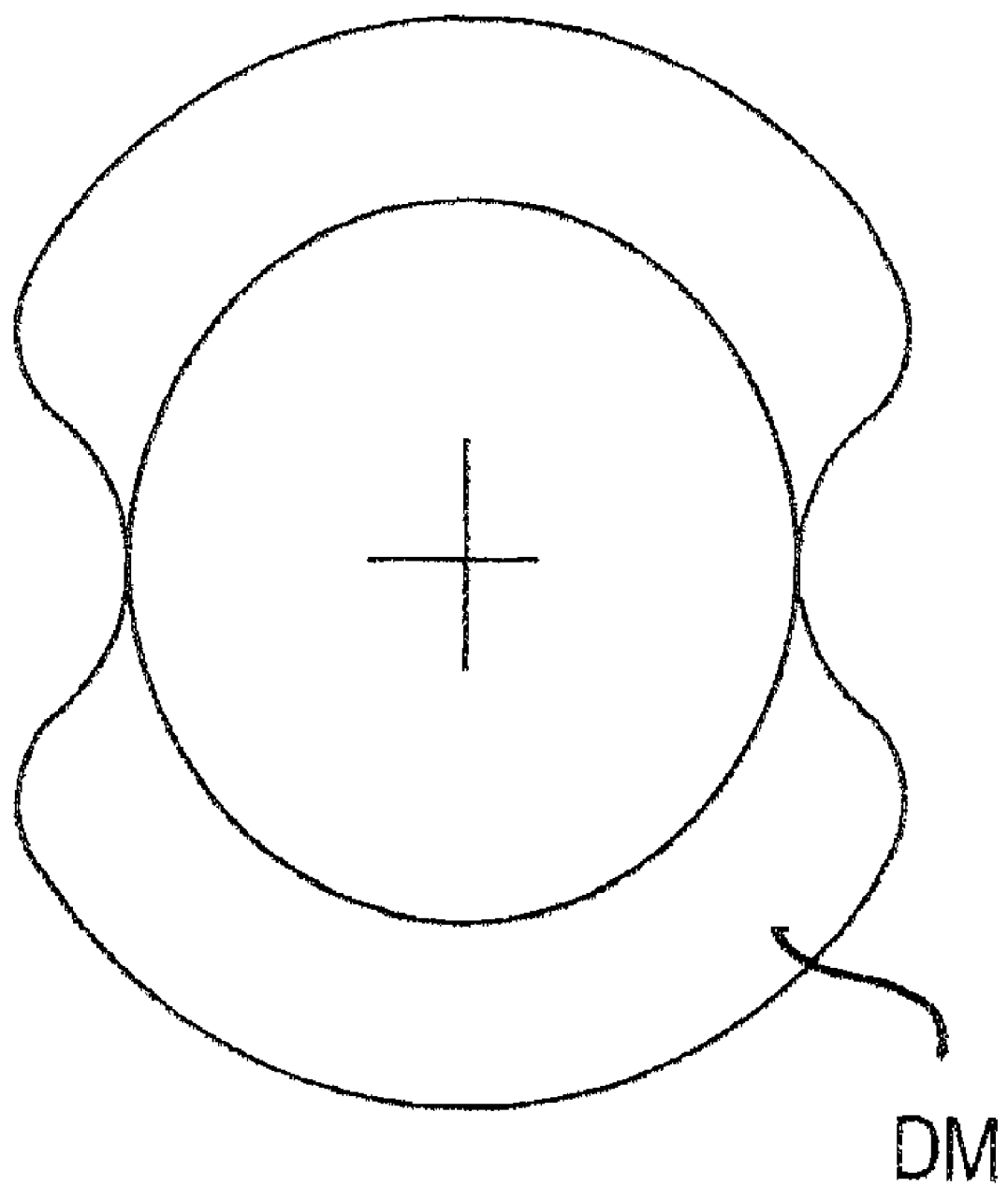
FIG. 2 is a schematical explanatory illustration of how the rotational torque occurs in the rotational device in accordance with the invention over a full revolution.

In the position as shown in FIG. 1 the rotational surface 1 has a positive angle a1 of e.g. +10° relative to the flowing direction S of the fluid whilst the rotational surface 2 in the actual position shown in FIG. 1 has a negative angle a2 of e.g. −10° to the flowing direction S of the fluid. Consequently, the mathematical absolute values of the angles a1 and a2 are equal. In following a complete circular motion of the first rotational surface 1, the angle a1 of the first rotational surface 1 in first and second quadrants of the circular motion of the rotational surface 1 or of the rotational motion of the rotational device about the central axis M, in other words between 0° and 180°, is constantly −10°. When the rotational surface 1 passes through the turning point at 180° the angle a1 changes to +10° relative to the flowing direction S of the fluid stream. This positive angle is then maintained constant during the entirety of the third and fourth quadrants of the circular motion, i.e. between 180° and 360° (=0°). On passing through 0°, the angle a1 then changes back to −10°. A corresponding angle setting of the angle a2 of the rotational surface 2 is performed in synchronism offset by 180° relative to the rotational surface 1. Referring now to FIG. 2, there is illustrated how the two rotational surfaces 1 and 2 generate a uniform positive torque DM substantially along their circular motion with the exception of the neutral positions at 0° and 180° in which the torque DM disappears or becomes zero.

Figure 3:
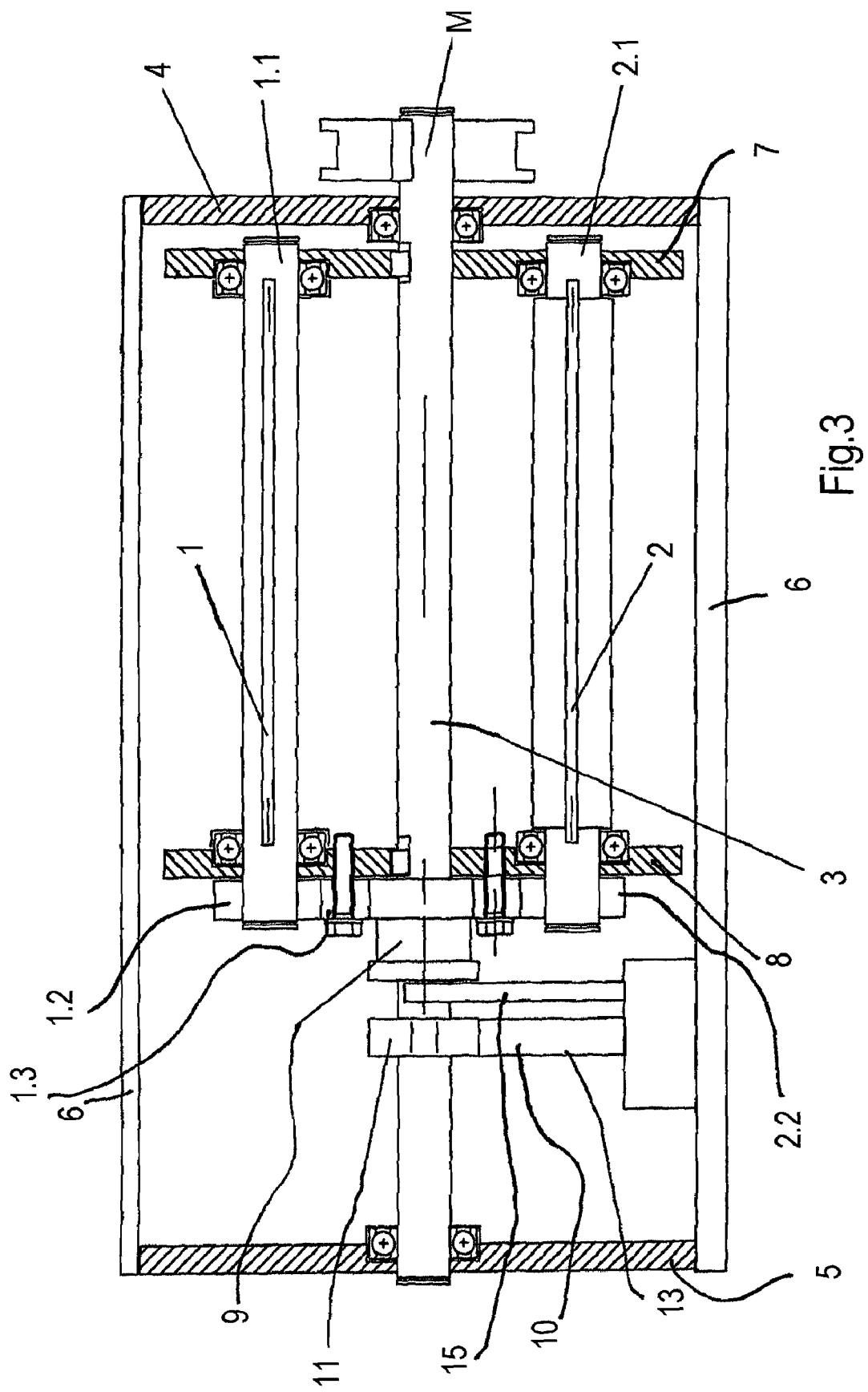
FIG. 3 is a detailed sectional view through the first embodiment as shown in FIG. 1 in a side view.
Figure 8:
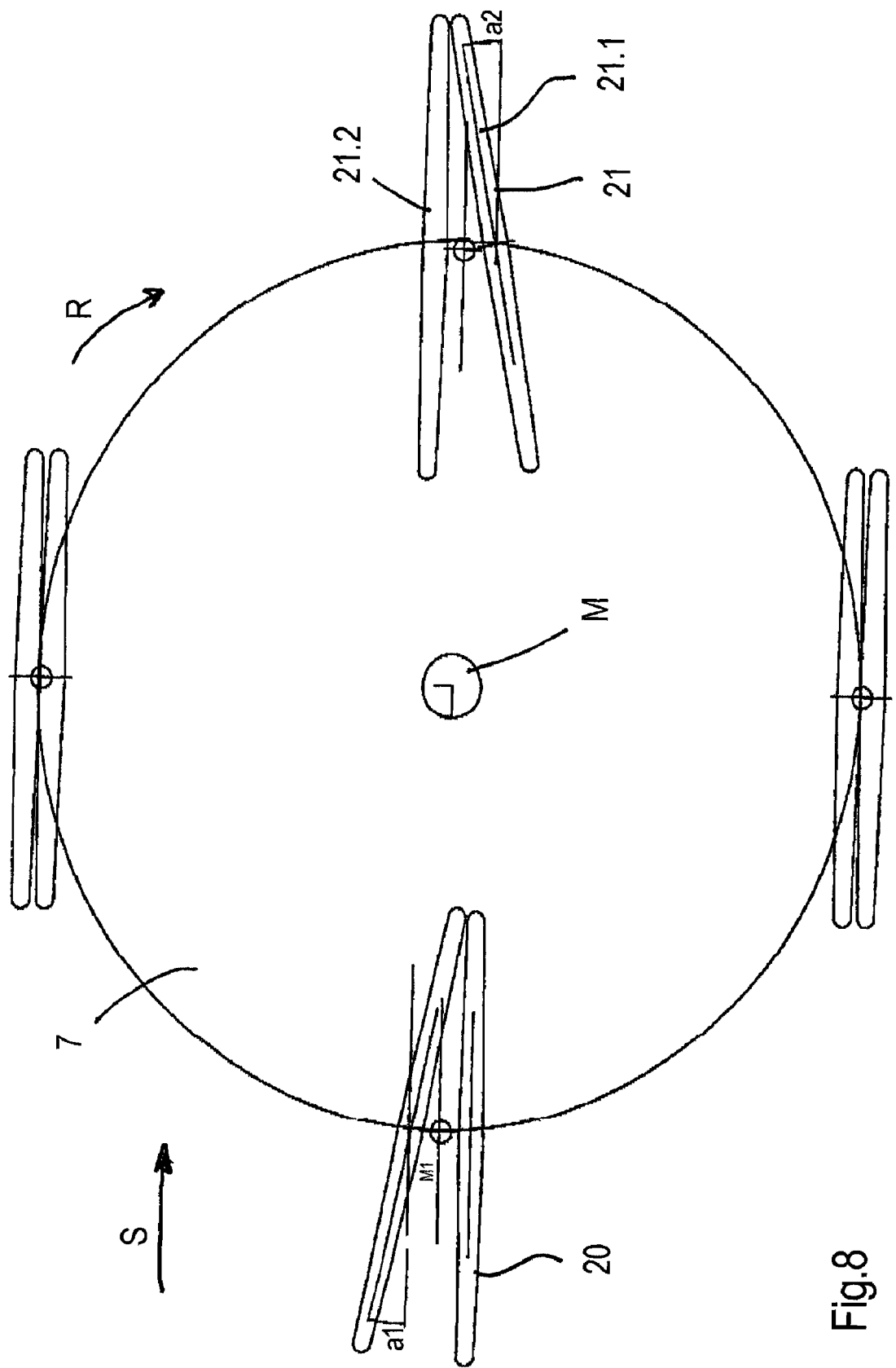
FIG. 8 is a schematical top-down view of a second example embodiment of the rotational device in accordance with the invention comprising two rotational surfaces changeable in shape, neutral positions of the rotational surfaces are shown.

Referring to FIG. 3, a main rotational means 3 or main rotational body of the rotational device is mounted between two or more stationary supporting cheeks 4 and 5 interconnected by bars 6 for rotation about its central rotary shaft M. The main rotational means 3 is defined laterally by one or more rotational cheeks 7 and 8 having circular area, being spaced away from each other, and being rigidly connected to the central rotary shaft M. A rotational surface rotary shaft 1.1 of the rotational surface 1 and a rotational surface rotary shaft 2.1 of the rotational surface 2 are rotationally mounted in the rotational cheeks 7 and 8. The rotational surface rotary shaft 1.1 and the rotational surface rotary shaft 2.1 are arranged parallel to and spaced away from the central rotary shaft M and they are located more in the vicinity of the edges of the disc-shaped rotational cheeks 7 and 8.

A rotary shaft gear 1.2 or pinion and a rotary shaft gear 2.2 or pinion rigidly or fixedly connected to the assigned rotary shaft are mounted on the extensions of the rotational surface rotary shafts 1.1 and 2.1, respectively. A reduction transmission by means of a gearing assembly is intended to serve in the case of the first embodiment of the invention as an operating example. Each of the rotary shaft gears 1.2 and 2.2 is coupled via an adapter gear 1.3 to a central rotary shaft gear 9 or a pivoting gear in the a ratio 1:1 which is rotationally mounted on the central rotary shaft M and capable of performing a motion relative to the central rotary shaft M. The central rotary shaft gear 9 on the central rotary shaft M is thus not rigidly connected to the rotary shaft M radially.

Adjustment, rotation or radial position of the central rotary shaft gear 9 is determined by adjusting means 10 or a controller of the rotational device. The adjusting means 10 is drivingly coupled via the central rotary shaft gear 9, the adapter gears 1.3 and rotary shaft gears 1.1 or 2.1 as drive to the rotational surfaces 1 and 2 to permit adjusting their angle a1 and a2, respectively, relative to the flowing direction S of the fluid. This adjusting motion of the rotational surfaces 1 and 2 can be generated by a pivoting motion or reciprocating motion of the central rotary shaft gear 9 by e.g. a mechanical cam (cf. FIG. 4 and FIG. 5) or by an electric drive (cf. FIGS. 6 and 7). In the first embodiment the adjusting means 10 has a controlling curve 11 with a controlling cam 12, the controlling curve 11 being rigidly connected to the central rotary shaft M. In addition, the adjusting means 10 comprises a pivoting rod 13 with a pivoting roller 14 which follows the controlling curve 11. The controlling cam 12 represents a projection corresponding to a rotational segment of 180°. The motion of the controlling curve 11 is transferred via the pivoting rod 13 and a thrust link 15 to the central rotary shaft gear 9, resulting in synchronized motion of angle adjustment of the rotational surfaces 1 and 2.

Referring now to FIGS. 6 and 7, there is illustrated an alternative adjusting means 10.1 working with an electric or electric motor drive coupled to the central rotary shaft gear 9.

Figure 9:
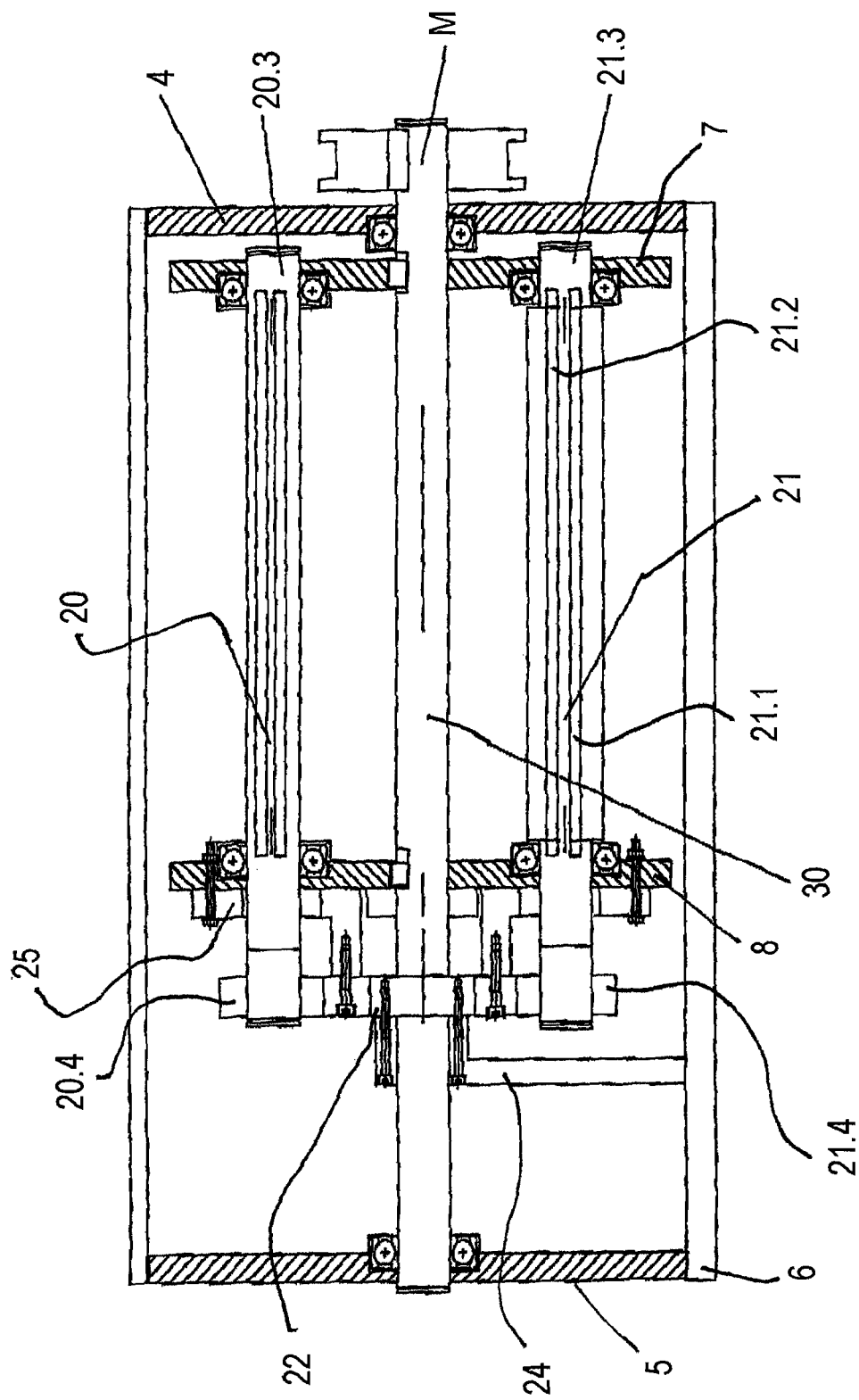
FIG. 9 is a detained sectional view of the second embodiment as shown in FIG. 8 in a side view.

Referring now to FIGS. 8 to 13, there is illustrated a further second embodiment example of the rotational device in accordance with the invention comprising two rotational shape-alterable rotational surfaces 20 and 21. The substantial difference of which as compared to the first embodiment in FIG. 3 is that the rotational surfaces 20 and 21 in FIG. 9 are designed to be alterable in shape to optimize incident moving stream of the fluid against the rotational surfaces.

In more detail, the rotational surfaces 20 and 21 are each structured with two intercoupled, e.g. rectangular, rounded blades 21.1 and 21.2 each of which can be pitched separately from the other. In a range of 0° to 180° (=0°) of the circular motion of a main rotational means 30 of the rotational device as shown the blade 21.1 is pitched by an angle of e.g. 10° constant from its parallel position whilst the blade 21.2 remains oriented parallel. Whereas in a range of 180° to 360° (=0°) the blade 21.1 is maintained constantly parallel whilst the blade 21.2 is pitched by an angle of e.g. +10° constantly relative to the flowing direction S of the fluid stream. In the neutral positions of 0° and 180° the two blades 21.1 and 21.2 are oriented parallel to each other and parallel to the flowing direction S of the fluid.

Referring now to FIG. 9, the main rotational means 30 is rotationally mounted about its central rotary shaft M between or in two or more stationary supporting cheeks 4 and 5 interconnected by bars 6. The main rotational means 30 is defined laterally by one or more e.g. circular plate-type rotational cheeks 7 and 8 spaced away from each other which are rigidly connected to the central rotary shaft M. A rotational surface rotary shaft 20.3 of the rotational surfaces 20 and a rotational surface rotary shaft 21.3 of the rotational surface 21 are rotationally mounted in the rotational cheeks 7 and 8. The rotational surface rotary shafts 20.3 and 21.1 are arranged parallel spaced away from the central rotary shaft M and are more located at the edges of the rotational cheeks 7 and 8.

On the elongations of the rotational surface rotary shafts 20.3 and 21.3 a rotary shaft gear 20.4 and rotary shaft gear 21.4, respectively, are seated which are rigidly or fixedly connected to the corresponding rotary shaft. As an operating example in the first embodiment a reduction gear mechanism is used. Each rotary shaft gear 20.4 and 21.4 is coupled in the ratio 1:1 via an adapter gear to a central rotary shaft gear 22 in which the central rotary shaft M can rotate and which is stationary fixedly connected by a connection 24 to the supporting cheeks 5 and 7.

Figure 11:
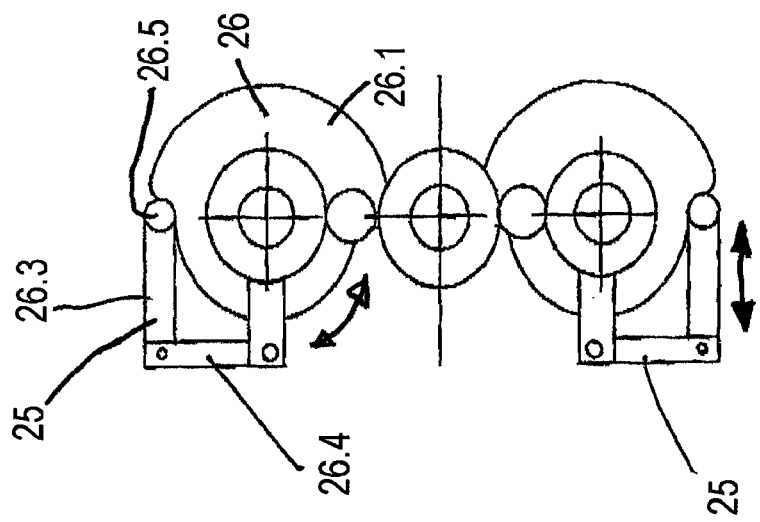
FIG. 11 is a view of the detail in FIG. 10 in the direction of the arrow XI in FIG. 10.
Figure 10:
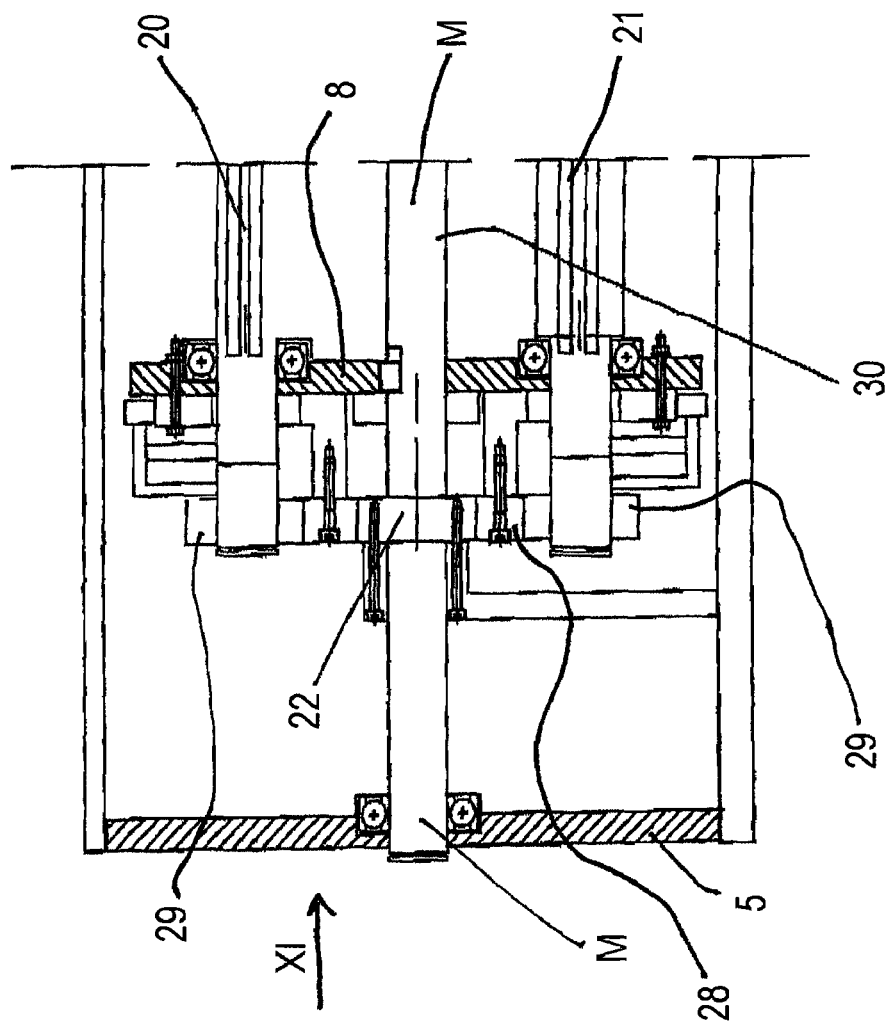
FIG. 10 is an extended, partial detail view of the embodiment as shown in FIG. 8, showing particularly adjusting means for the shape-alterable rotational surfaces in the second embodiment as shown in FIGS. 8 and 9.
Figure 12:
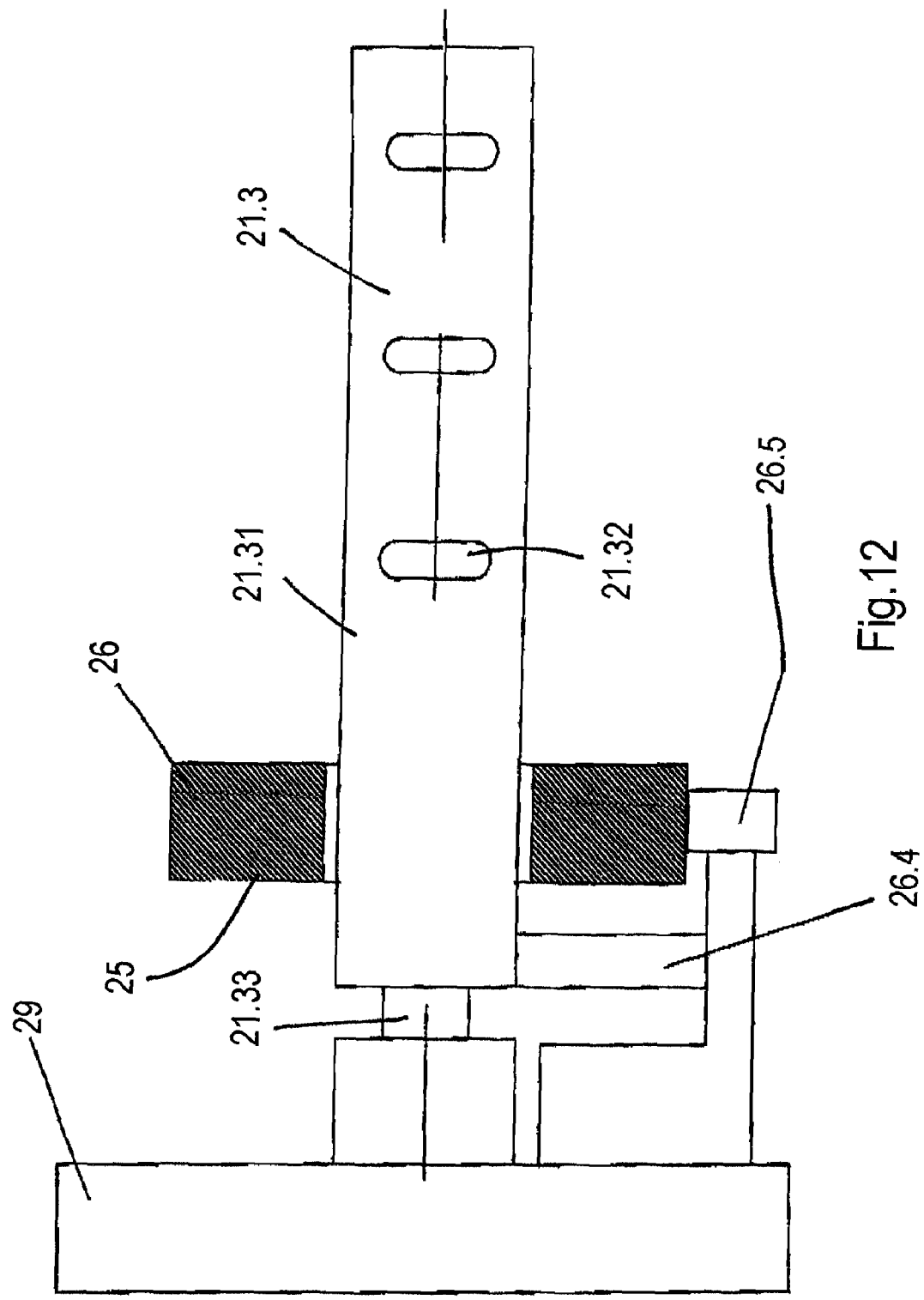
FIG. 12 is a magnified detail view of FIG. 10, showing in particular part of the adjusting means.
Figure 13:
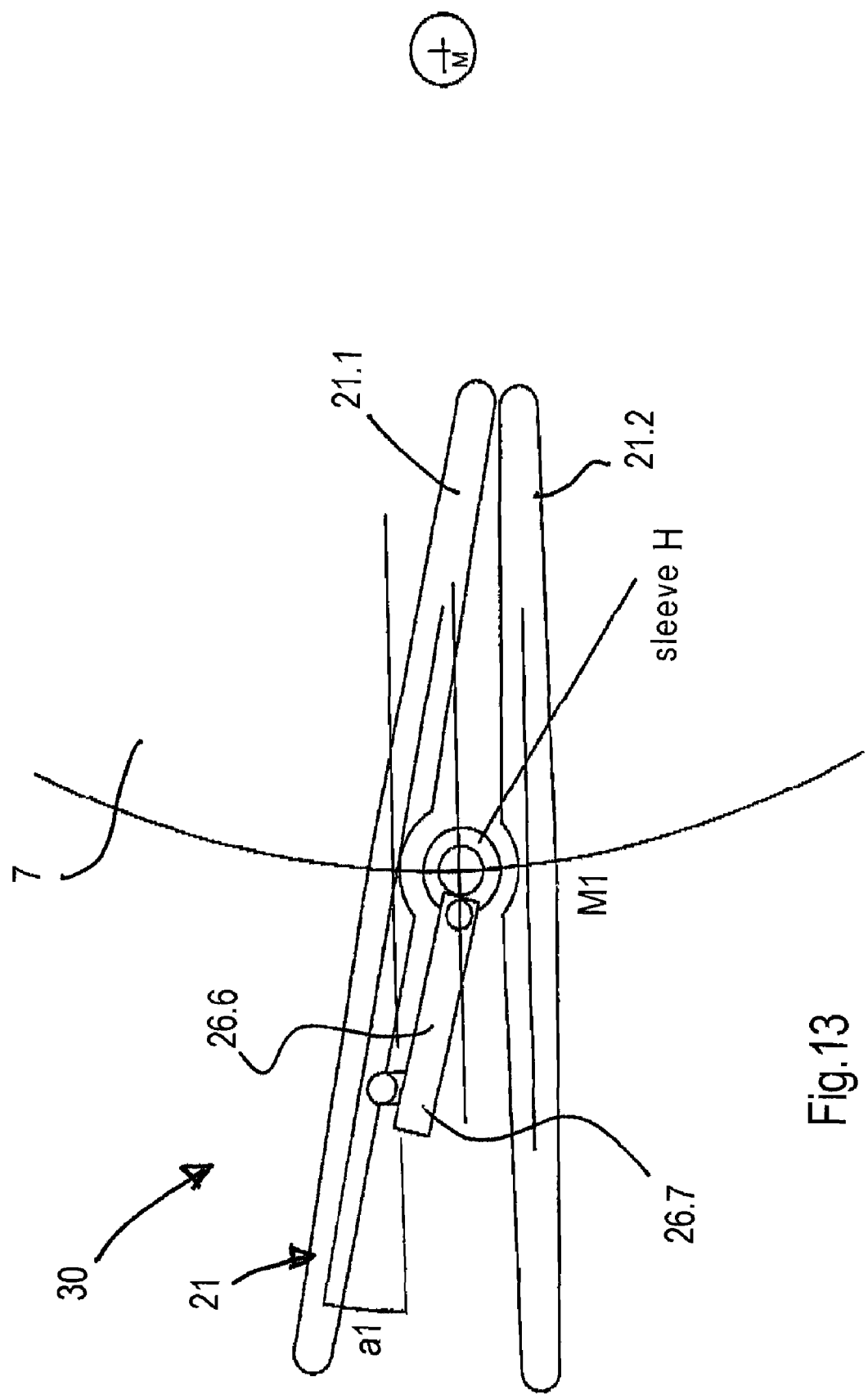
FIG. 13 is a selected detail view of a rotational shape-alterable surface with adjusting means in a first pitched angle position of the rotational surface.

For pitching each blade 21.1 and 21.2 of the rotational shape-alterable rotational surface 21 adjusting means 25 is provided on each rotational surface rotary shaft 20.3 and 21.3. As shown in FIG. 10, FIG. 11, and FIG. 12, each adjusting means 25 comprises a controlling curve 26 with a formed cam 26.1 across 180°, a pivoting rod 26.3, a pivoting roller 26.5 at the pivoting rod 26.3, a thrust link 26.4 and a blade drive 26.6 coupled by a linkage 26.7 to the blade 21.1 of the rotational surface 21 for pitching this blade 21.1. A similar thrust link is provided to pitch the blade 21.1 of the rotational surface 21.

Controlling cams 26.1 within the rotation system can adjust the rotational surfaces 20 and 21 directly to the desired angle or surfaces having an alterable cross-section are to be pitched in general such that the most effective buoyancy is generated.

Also in this second embodiment, the reduction in the ratio of 1:1 of the rotational surface rotary shafts 20.3 and 21.3 relative to the central rotary shaft M is provided with an adapter gear for reversing the direction of rotation of the rotational surfaces 20.3 and 22.3. This reduction ensures that there is no change in the pitch of the rotational surfaces 20.3 and 21.3 in the first and second quadrants, and third and fourth quadrants, respectively.

The pivoting motion of the rotational surfaces 20.3, 21.3, respectively of their blades 21.1 and 21.2, is implemented on application of the cam 26 at the rotational body by rotational surface rotary shafts 20.3 and 21.3, each having a sleeve 21.31. Each controlling curve 26 or thrust link 26.4 is separately connected to the reduction gear and the rotational surface rotary shaft or conversely.

The adapter gears 28 are mounted on the rotational cheek 8. The rotary shaft gears 29 are rigidly connected to the rotary shafts 20.3 and 21.3. More precisely, the rotational surface rotary shafts 20.3 and 21.3 are split in two in featuring an inner main shaft 21.33 and the outer shaft sleeve 21.31.

The thrust link 26.4 is secured to the pivoting rod 26.3 at the rotary shaft gear 29 and like the gear 29 rotates in the ratio 1:1 relative to the central rotary shaft gear 22. The pivoting rod 26.3 together with the roller 26.5 in this arrangement are moved on the controlling curve 26 making a positive and negative lifting motion at 0 deg. and 180 deg. which is transferred by the thrust link 26.4 to the sleeve 21.31 of the rotational surface rotary shaft and to the blades 21.1 and 21.2 of the rotational surface to set the optimal target angle of buoyancy.

Slotted holes 21.32 or other openings make connection to the main rotary shaft 21.33 enabling the neutral position of the main rotary shaft 21.33 to be used as the reference point for pitching the blades or rotational surfaces. During rotation of the rotary shaft sleeve 21.3 by means of the aforementioned thrust link 26.4 in conjunction with the controlling curve 26.1 and the pivoting roller 26.3, 26.5, a pitch control lever of the blade drive 26.6 (see FIG. 13) rotates the top side or blade 21.1 of the rotational surface 21 into the wanted angle of buoyancy. Analogously at the opposite side (see FIG. 12), the underside or blade 21.2 is also positioned to the wanted angle of buoyancy by a pitch control lever. Resetting the blades 21.1 and 21.2 after a semi-rotation of the rotational body can be done by spring force or via the shaft sleeve 21.3 and a shifting lever.

Figure 14:
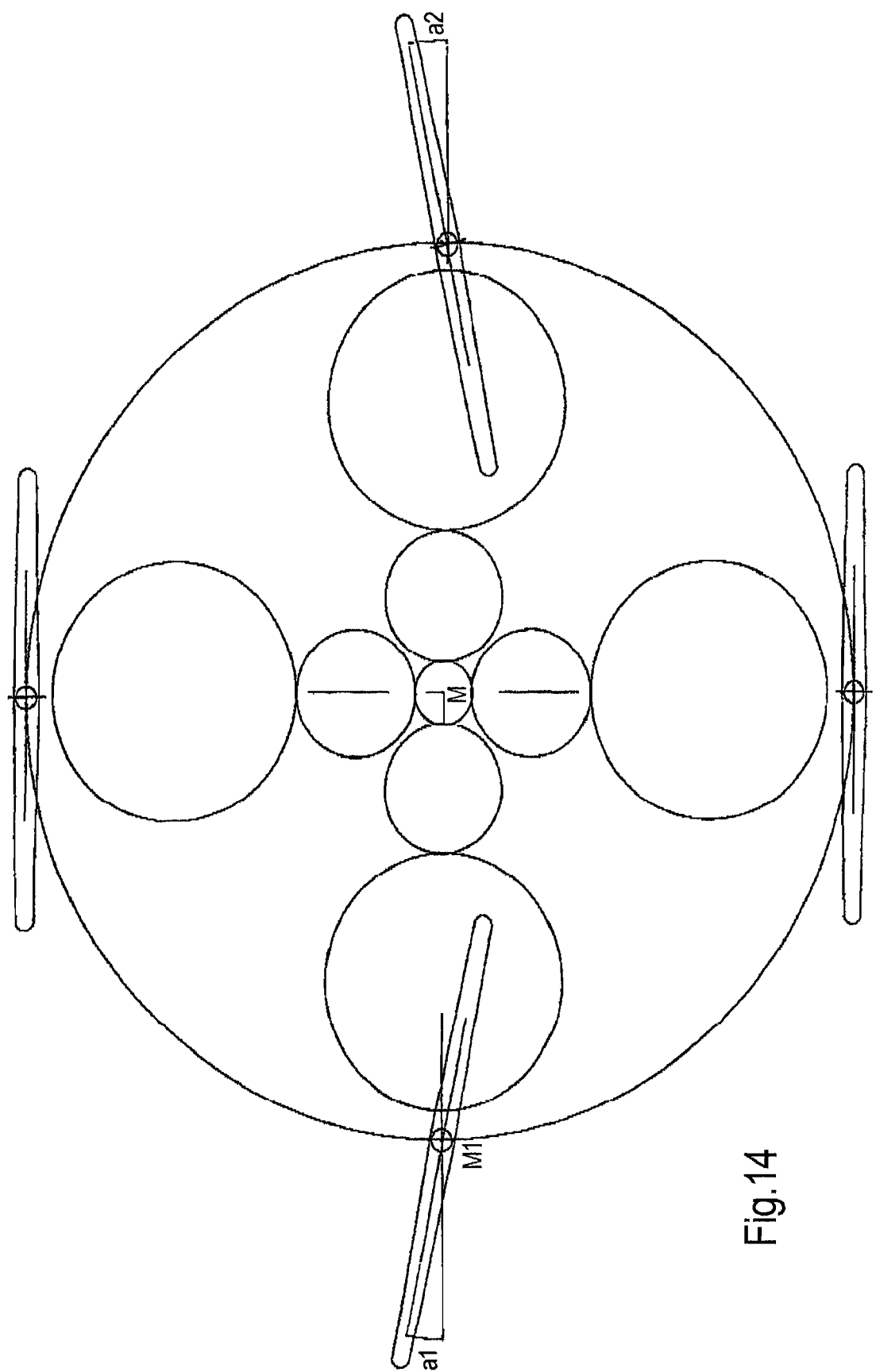
FIG. 14 is a schematical top-down view of a further third embodiment of the rotational device in accordance with the invention featuring four rotational surfaces moving in synchronism.

FIG. 14 is a schematical top-down view of a further third embodiment of the rotational device in accordance with the invention comprising four rotational surfaces moving in synchronism.

Here too, a non-uniform reduction, powered mechanically or electrically, pitches the rotational surfaces over the first 180 deg. of the motion about central rotary shaft M to a flow-supporting angle of e.g. 10-12 deg. advancing or leading the actual reduction and over the second 180 deg. again to a flow-supporting angle of e.g. 10-12 deg. lagging actual reduction. This non-uniform reduction in transmission in the quadrants e.g. three and four provides advancing of the rotational surface by an angle of e.g. 10 deg. and lagging by an angle of e.g. 10 deg. in quadrants one and two. This makes it possible to position each rotational surface over a large portion of the rotational angle in rotational motion about a fulcrum M at an angle favorably effective relative to the both the mass inflow and outflow.

The invention claimed is:

1. Rotational device for use in a fluid and for extracting energy from the moving stream of a fluid or for converting energy into motion of a fluid, the rotational device comprising:
    two or more stationary supporting cheeks;
    a central rotary shaft;
    main rotating means comprising one or more rotational cheeks spaced away from each other and rigidly connected to the central rotary shaft, two or more rotational surfaces each coupled rotatable about a rotational surface rotary shaft spaced away from the central rotary shaft of the main rotating means such that the main rotating means can execute by the rotational surfaces a rotational motion about the central rotary shaft, the rotational surfaces rotary shafts extending parallel to the central rotary shaft of the main rotating means and being mounted in the rotational cheeks, adjusting means adjusting the angles or inclinations of the rotational surfaces to a flowing direction of the fluid, and
    a pivoting control wheel coupled to the adjusting means and arranged to rotate freely about the central rotary shaft, wherein
    the rotational surface rotary shafts extending between the rotational cheeks;
    the central rotary shaft extending between the supporting cheeks that are interconnected by bars, and the rotational cheeks, and
    the pivoting control wheel is coupled to the two or more rotational surfaces such that its rotational motion is transferred to the rotational surfaces to adjust the angles or inclinations of the rotational surfaces relative to the flowing direction of the fluid synchronously.

2. Rotational device as set forth in claim 1, wherein a rotary shaft gear is mounted on a rotational surface rotary shaft and a rotary shaft gear is mounted on the other rotational surface rotary shaft, the rotary shaft gears are rigidly or fixedly connected to their rotational surface rotary shafts, and
    that each rotary shaft gear is coupled via an adapter gear to a pivoting gear as the pivoting control wheel.

3. Rotational device as set forth in claim 2, wherein the rotary shaft gears are coupled via the adapter gears to the pivoting gear in the transmission ratio 1:1.

4. Rotational device as set forth in claim 2, wherein the adjusting means is coupled via the pivoting gear, both of the adapter gears, and rotary shaft gears as drive to both of the rotational surfaces to adjust their angle or inclination relative to the flowing direction (S) of the fluid.

5. Rotational device as set forth in claim 1, wherein the adjusting means has a mechanical curve device or electric drive for generating a pivoting motion or reciprocating motion of the pivoting gear.

6. Rotational device as set forth in claim 5, wherein the adjusting means comprising:
- a controlling curve with a controlling cam, the controlling curve being rigidly connected to the central rotary shaft;
- a pivoting rod with a pivoting roller which follows the controlling curve;
- a thrust link coupled to the pivoting rod and the pivoting gear for transferring of a motion of the controlling curve via the pivoting rod and the thrust link to the pivoting gear to control the angle motion of the rotational surfaces synchronously.

7. Rotational device as set forth in claim 1, wherein an inclination of the rotational surfaces is in a range −25° to 25° relative to the flowing direction of the fluid.

8. Rotational device as set forth in claim 1, wherein the adjusting means adjusts the angle of the respective rotational surface through 0° to 180° of the rotational motion of the main rotating means to a first, constant positive angle and that the adjusting means adjusts the angle of the rotational surface through 180° to 360° of the rotational motion of the main rotating means to a second, constant negative angle relative to the flowing direction of the fluid, the angles having the same value with reversed sign relative to the flowing direction of the fluid.

9. Rotational device as set forth in claim 1, wherein the adjusting means set a neutral position of the rotational surface relative to the flowing direction of the fluid in which the rotational surface does not exert any rotational torque on the main rotating means.

10. Rotational device as set forth in claim 1, wherein the two or more rotational surfaces are configured shape-alterable and that each rotational surface has two blades that are coupled to each other and each of which can be pitched separately from the other.

11. Rotational device as set forth in claim 10, wherein in a range from 0° to 180°(=0°) of the circular motion of the main rotational means the blade of a rotational surface is pitched by an angle of e.g. 10° constant from its parallel position whilst the other blade of the rotational surface remains oriented parallel, and wherein in a range of the circular motion from 180° to 360° (=0°) the blade is maintained constantly parallel whilst the other blade is pitched by a constant angle relative to the flowing direction of the fluid stream, and wherein in the neutral positions of 0° and 180° the two blades are oriented parallel to each other and parallel to the flowing direction of the fluid.

12. Rotational device as set forth in claim 10, wherein a rotary shaft gear and a further rotary shaft gear, respectively, are seated on the rotational surface rotary shafts which are rigidly or fixedly connected to their rotational surface rotary shafts, and wherein the rotary shaft gears are respectively coupled in the ratio 1:1 via an adapter gear to a central rotary shaft gear in which the central rotary shaft can rotate and which is stationary fixedly connected by a connection to the supporting cheeks.

13. Rotational device as set forth in any of the claim 10, wherein adjusting means is provided on each rotational surface rotary shaft for pitching each blade of the shape-alterable rotational surface.

14. Rotational device as set forth in claim 13, wherein each adjusting means comprises a controlling curve with a formed cam across 180° , a pivoting rod, a pivoting roller at the pivoting rod, a thrust link, and a blade drive coupled by a linkage to the blade of the rotational surface for pitching this blade.

15. Rotational device as set forth in claim 14, wherein each rotational surface rotary shaft is split in two in featuring an inner main shaft and an outer shaft sleeve and that slotted holes or other openings in the outer shaft sleeve are provided for a reference point for pitching the blades or rotational surfaces.

* * * * *